(12) United States Patent
Veselinovic et al.

(10) Patent No.: US 8,160,601 B2
(45) Date of Patent: Apr. 17, 2012

(54) METHOD FOR OPTIMIZING SPATIAL MODULATION IN A WIRELESS LINK AND NETWORK ELEMENT THERETO

(75) Inventors: Nenad Veselinovic, Espoo (FI); Juha Ylitalo, Oulu (FI)

(73) Assignee: Elektrobit Wireless Communications Ltd., Oulu (FI)

( * ) Notice: Subject to any disclaimer, the term of this patent is extended or adjusted under 35 U.S.C. 154(b) by 1335 days.

(21) Appl. No.: 11/766,245

(22) Filed: Jun. 21, 2007

(65) Prior Publication Data

US 2008/0317014 A1    Dec. 25, 2008

(51) Int. Cl.
*H04W 72/00* (2009.01)
(52) U.S. Cl. ............... 455/452.2; 455/453; 455/454; 455/455; 370/232; 370/233; 370/234; 370/235
(58) Field of Classification Search .......... 370/216–253, 370/203–210, 394; 455/452.1–452.2, 453–455, 455/423–425
See application file for complete search history.

(56) References Cited

U.S. PATENT DOCUMENTS

| | | | |
|---|---|---|---|
| 7,675,894 B2* | 3/2010 | Wunder et al. ............... | 370/343 |
| 2003/0076787 A1* | 4/2003 | Katz et al. ............... | 370/252 |
| 2006/0009228 A1* | 1/2006 | Kang et al. ............... | 455/450 |
| 2006/0079221 A1* | 4/2006 | Grant et al. ............... | 455/423 |
| 2006/0094436 A1* | 5/2006 | Kim et al. ............... | 455/450 |
| 2007/0225014 A1* | 9/2007 | Kurose ............... | 455/452.2 |
| 2009/0130986 A1* | 5/2009 | Yun et al. ............... | 455/67.11 |
| 2009/0268625 A1* | 10/2009 | Hyttinen et al. ............... | 370/252 |
| 2010/0322351 A1* | 12/2010 | Tang et al. ............... | 375/316 |
| 2011/0034206 A1* | 2/2011 | Venkatraman et al. ....... | 455/522 |

\* cited by examiner

*Primary Examiner* — Nick Corsaro
*Assistant Examiner* — Sarwat Chughtai
(74) *Attorney, Agent, or Firm* — Young & Thompson (57) ABSTRACT

The selection of the spatial mode together with modulation and encoding schemes based on channel condition measurements requested from MS forms a basis for selecting a best transmission data rate in a wireless link in every channel conditions. A method and network element comprising multiple-input multiple-output (MIMO) capable antenna technology allows the use of a best transmission data rate in the channel if selection of transmission mode has been made correctly. The thresholds for transmission mode selections are pre-determined and compared to instantaneous channel quality information. The practical MIMO solution based on correct selection procedure provides also continuous sufficient channel condition for terminal users when the user moves from LOS situation to NLOS situation.

28 Claims, 8 Drawing Sheets

METHOD FOR OPTIMIZING SPATIAL MODULATION IN A WIRELESS LINK AND NETWORK ELEMENT THERETO

TECHNICAL FIELD OF THE INVENTION

This invention relates generally to a method for selecting a best transmission mode in a wireless link in every channel conditions, and more particularly to a better deployment of a channel-feedback available at the mobile station in the selection process. This invention also relates to a network element for selecting a best transmission mode in a wireless link in every channel conditions and more particularly to a better deployment of a channel-feedback available at the mobile station in the selection process in the base station.

BACKGROUND OF THE INVENTION

Wireless broadband services can provide tens of megabits per second of capacity per channel from each base station (BS) to subscriber stations (SS) such as mobile stations (MS) with a baseline configuration. The high data throughput (peak data rate) is essential requirement to enable broadband data services including data, streaming video and voice-over-IP (VoIP) with high quality of service. Wireless broadband technologies have been developed to provide broadband wireless access in order to adapt services and applications for mobile Internet.

The transmission data rate in the wireless link between BS and MS depends on the channel conditions that may vary substantially during the link connection. Coding and modulation schemes used for transmission of data over the air interface have an effect on transmission data rate.

Technical Specifications IEEE 802-16e (Mobile WiMax) describes Orthogonal Frequency Division Multiplexing (OFDM) multiplexing technique that subdivides the bandwidth into multiple frequency sub-carriers where the input data stream is divided into several parallel sub-streams of reduced data rate and each sub-stream is modulated and transmitted on a separate orthogonal sub-carrier. The reduced data rate means increased symbol duration and therefore improves the robustness of OFDM to delay spread. OFDM exploits the frequency diversity of the multipath channel coding and interleaving the information across the sub-carriers prior to transmission. In OFDM resources are available in the time domain by means of OFDM symbols and in the frequency domain by means of sub-carriers. The time and frequency resources can be organised into sub-channels for allocation to individual users. Active sub-carriers are grouped into sub-channels for both DL and UL transmission.

According to the WiMax specifications MS can feedback channel-state information. A channel quality indicator (CQI) channel is utilized to provide channel-state information from the user terminals to the base station scheduler. Relevant channel-state information includes physical CINR (carrier-to-interference-and-noise ratio), effective CINR, MIMO (multiple-input multiple-output) mode selection and frequency selective sub-channel selection. The CQI channel provides channel information feedback to enable scheduler to choose appropriate coding and modulation for each allocation. CQI contains measurement feedback information for BS to select transport format (MCS—modulation and coding scheme) and resource. The adaptive modulation and coding, HARQ (hybrid auto repeate request) and power control provide robust transmission over the time-varying channel. Since the resource allocation information is conveyed in the MAP message at the beginning of each frame, the scheduler can change the resource allocation on a frame-by-frame basis in response to traffic and channel conditions.

Mobile WiMax specifications describe antenna technologies that support two MIMO modulation schemes: space-time code (STC) and spatial multiplexing (SM). STC provides large coverage area regardless of channel condition but does not improve the peak data rate (throughput). With 2×2 MIMO, SM increases the peak data rate (throughput) by transmitting two data streams when channel conditions are adequately good. Mobile WIMAX supports switching between these options under different channel conditions but the selection does not guarantee the best transmission data rate in every channel conditions for the reasons below.

The disadvantage of known spatial modulation mode selection mechanisms is that BS has to rely on capabilities offered by MSs. The measurement of the channel condition of the wireless downlink is typically MS related procedure. MS is arranged to measure channel quality e.g. using average CINR (carrier-to-interface-and-noise ratio) measurements. The average CINR measurement by the MS can be used as a basis for selecting the preferred spatial mode to be used by BS. However, if BS relies on this preference it may not be able to make always correct decisions for optimal transmission mode in instantaneous channel conditions. This is the case when MS is not supporting modulation mode selection feedback measurements or when MS is not capable of signalling its modulation mode preference itself. Some of known spatial mode selection mechanisms rely on reciprocity of the wireless channel between downlink (DL) and uplink (UL) which is not always satisfied. Some known mechanisms require complex calculation of eigen-value decomposition of the channel matrix, and they are therefore complex solutions. Technical documents in UMTS (universal mobile telecommunications system) specification for one suggests that the mode change is solely based on the SNR (signal-to-noise ratio) so that the users close to BS employ spatial mode and other users use diversity. Also when MS goes around a corner of the building and thus moves from the line-of-sight (LOS) area to non-line-of-sight (NLOS) area, the SNR and channel capacity goes down dramatically whereas the delay spread goes up significantly during the LOS-NLOS change. The reason for the capacity drop is the fact that the signal level (and the SNR) is greatly reduced in NLOS area. The above-mentioned spatial mode selection mechanisms do not support BS sufficiently accurate so that it can make a correct decision of mode selection for optimal transmission data rate in instantaneous channel conditions.

For the reasons above the optimal capacity of the channel, i.e. the best transmission mode in the wireless link between BS and MSs is not always guaranteed. The problems set forth above are overcome by centralizing a decision making of the transmission mode in BS.

SUMMARY OF THE INVENTION

It is an objective of the invention to provide a best transmission mode of a frame in every channel conditions to be transmitted in a wireless link between BS and MS in order to maximize the total transmission throughput. The multiple antenna technologies allow to use different transmission modes for different channel conditions. However there is a need to have a mechanism for selecting the transmission mode that offers the best transmission data rate, i.e. throughput in all possible channel conditions simply and accurately. Another objective of the invention is to improve reliability of data transmission and therefore minimising channel capacity drop between MS and BS when the radio channel conditions change. This may happen e.g. when moving between the line-of-sight (LOS) and non-line-of-sight (NLOS) situations, as the mobile station is carried around a corner of the building or such.

The objectives of the invention are achieved by making better use of mandatory set of measurements of the channel condition that every mobile station has to provide on request of the base station. The objectives of the invention are also achieved by better deploying spatial modulation technologies, such as space-time coding (STC) and spatial multiplexing (SM), and modulation and coding scheme (MCS) in different transmission configurations in order to select the best transmission mode in all conditions, and therefore maximizing the total transmission throughput. Further the objectives of the invention are achieved by centralizing a decision making of the transmission mode selection to the base station and therefore reducing interdependence of the decision making of the mobile station. Further the objectives of the invention are achieved by applying dual-polarized antennas in different transmission modes effectively so that the system performance is also improved in LOS-NLOS situations.

The invention is characterised by what is presented in the characterising parts of the independent claims. Embodiments of the invention are presented in dependent claims.

In accordance with a first aspect of the invention there is provided a method for selecting a best transmission mode for frame in a wireless channel in every channel conditions, comprising receiving at a base station as a response to a request at least one condition figure indicating instantaneous condition of a channel, mapping at the base station the condition figure to a first threshold range, said first threshold range being limited with a first minimum threshold value and a first maximum threshold value and being predefined to correspond the condition figure, selecting at the base station a comparison value to be within the first threshold range, comparing at the base station the comparison value to at least one second threshold range being limited with a second minimum threshold value and a second maximum threshold value, wherein each of said second threshold ranges is stored in the base station and is pre-determined to correspond to a transmission mode of a best transmission data rate, and selecting at the base station the transmission mode corresponding to the second threshold range within which the comparison value belongs in order to transmit the frame forwards.

According to an embodiment of the present invention the condition figure represents a single, either physical or effective, channel-condition measurement of the channel received from MS and the second threshold range is stored in BS in a form of one dimensional table or one dimensional projection derived from multidimensional tables. Alternatively, a single channel-condition measurement is a combination of channel-condition measurements of n layers of the channel and the second threshold range is stored in BS in a form of one dimensional table or one dimensional projection derived from n-dimensional tables, where n refers to a number of measured layers of the channel. Alternatively, the condition figure represents a channel-condition measurement of a layer of the channel received from MS and the second threshold range is stored in BS in a form of n-dimensional table, where n refers to a number of measured layers of the channel.

Preferably, selection of the transmission mode is vertical encoding with same modulation for each layer of the channel.

According to another embodiment of the present invention the condition figure represents a channel-condition measurement of a layer of the channel received from MS and the second threshold range is stored in BS in a form of n-dimensional table, where n refers to a number of measured layers of the channel.

Preferably, selection of the transmission mode is vertical encoding with different modulation for each layer of the channel.

According to still another embodiment of the present invention the condition figure represents a channel-condition measurement of a layer of the channel received from MS and the second threshold range is stored in BS in a form of one dimensional table.

Preferably, selection of the transmission mode is horizontal encoding.

In accordance with a second aspect of the invention there is provided a network element (in a base station), comprising a receiver comprising an antenna arranged to receive as a response to a request at least one condition figure indicating instantaneous condition of a channel, a controller arranged to map the condition figure to a first threshold range, said first threshold range being limited with a first minimum threshold value and a first maximum threshold value and being predefined to correspond the condition figure, a means for selecting a comparison value arranged to be within the first threshold range, a memory arranged to store at least one second threshold range being limited with a second minimum threshold value and a second maximum threshold value, the second threshold range being pre-determined to correspond to a transmission mode of a best transmission data rate, a decision making block arranged to compare the comparison value to at least one second threshold range, the decision making block arranged to select the transmission mode corresponding to the second threshold range within which the comparison value belongs, and a transmitter comprising an antenna arranged to transmit the frame forwards.

According to an embodiment of the present invention the receiver in BS is arranged to receive from MS the condition figure that represents a single, either physical or effective, channel-condition measurement of the channel and the memory in BS is arranged to store the second threshold range in a form of one dimensional table or one dimensional projection derived from multidimensional tables. Alternatively, means for combining is arranged to produce a single channel-condition measurement that is a combination of channel-condition measurements of n layers of the channel and the memory in BS is arranged to store the second threshold range in a form of one dimensional table or one dimensional projection derived from n-dimensional tables, where n refers to a number of measured layers of the channel. Alternatively, the receiver in BS is arranged to receive from MS the condition figure that represents a channel-condition measurement of a layer of the channel and the memory in BS is arranged to store the second threshold range in a form of n-dimensional table, where n refers to a number of measured layers of the channel.

Preferably, the decision making block in BS is arranged to select for transmission vertical encoding with same modulation for each antenna.

According to another embodiment of the present invention the receiver in BS is arranged to receive from MS the condition figure that represents a channel-condition measurement of a layer of the channel and the memory in BS is arranged to store the second threshold range in a form of n-dimensional table, where n refers to a number of measured layers of the channel.

Preferably, the decision making block in BS is arranged to select for transmission vertical encoding with different modulation for every antenna.

According to still another embodiment of the present invention the receiver in BS is arranged to receive from MS the condition figure represents a channel-condition measurement of a layer of the channel and the memory in BS is arranged to store the second threshold range in a form of one dimensional table.

Preferably, the decision making block in BS is arranged to select for transmission horizontal encoding.

In accordance with a third aspect of the invention there is provided a computer-readable medium having computer-executable components, comprising receiving as a response to a request at least one condition figure indicating instantaneous condition of a channel, mapping the condition figure to a first threshold range, said first threshold range being limited with a first minimum threshold value and a first maximum threshold value and being predefined to correspond the condition figure, selecting a comparison value arranged to be within the first threshold range, storing at least one second threshold range being limited with a second minimum threshold value and a second maximum threshold value, the second threshold range being pre-determined to correspond to a transmission mode of a best transmission data rate, comparing the comparison value to at least one second threshold range, and selecting the transmission mode corresponding to the second threshold range within which the comparison value belongs.

One benefit of the embodied invention provides a solution in which a maximum transmission data rate for a frame in any channel conditions is achieved reliably and therefore is more accurate for adaptation than traditional methods. Another benefit of the embodied invention provides a possibility to deploy mandatory set of channel-condition measurements that MS has to provide on request. Another further benefit of the embodied invention is that a solution is based only on the channel-condition measurements that are supported by the WiMax standard specified in Technical Specifications IEEE 802.16e-2005 & 802.16/Cor 2. Further the embodied invention applies multiple-input multiple-output (MIMO) technology that is a mandatory feature to be supported in WiMax related products. Still another benefit of the embodied invention is that it does not rely on the reciprocity of the wireless channel and therefore provides reliable and fast applicable decision making in BS regardless of the presence or absence of any MS preference for transmission. Still another benefit of the embodied invention is that it provides a simple and ready-to-use solution without needing complex calculation procedures.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An embodiment of the invention will be described in detail below, by way of example only, with reference to the accompanying drawings, of which

DETAILED DESCRIPTION OF THE INVENTION

Figure 1:
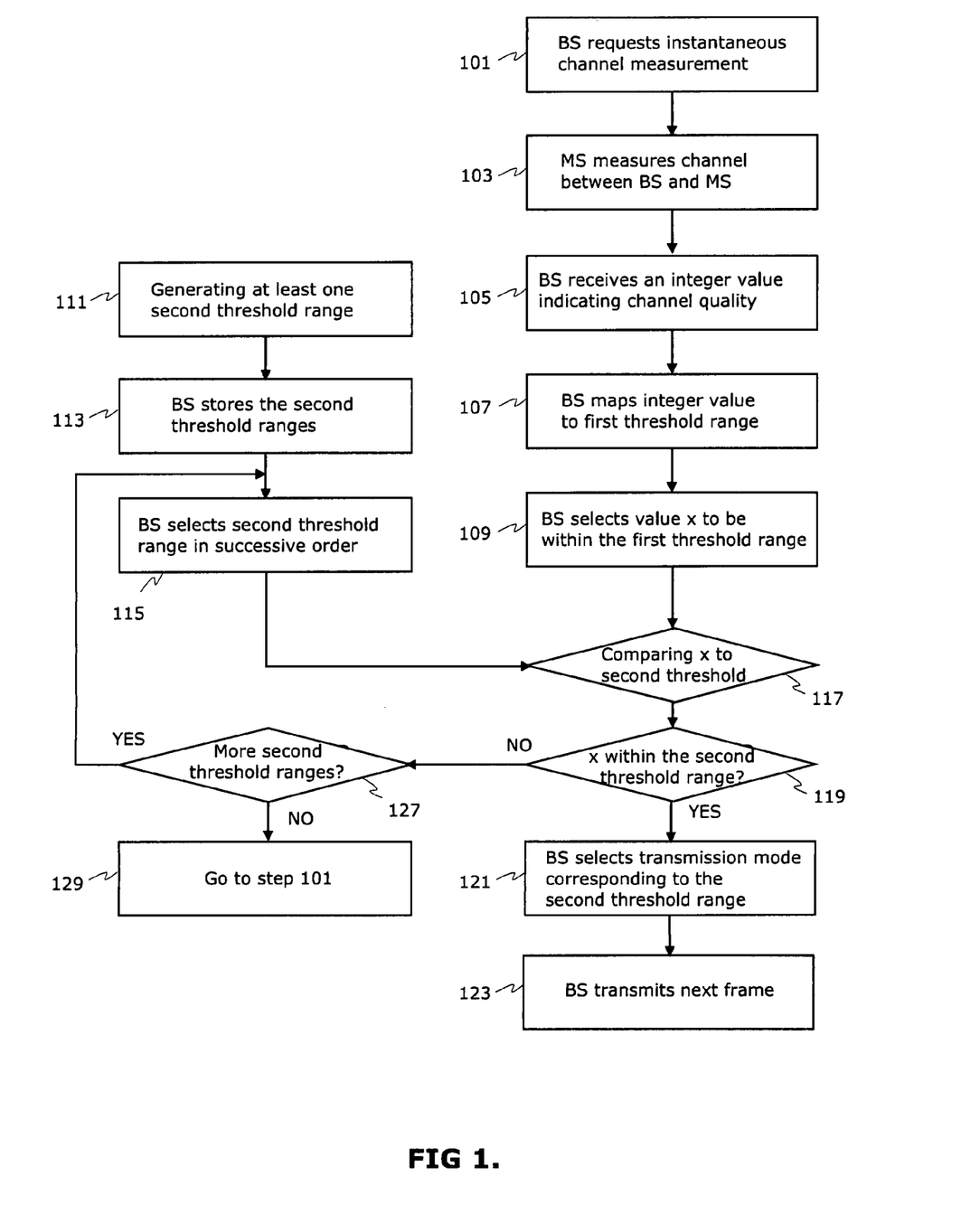
FIG. 1 depicts a flow diagram of a method according to the invention.

FIG. 1 depicts that in step 101 BS requests MS to send information about a channel quality in the wireless link between BS and MS. The request includes information about what type of channel-condition measurement is desired by BS and at least a parameter defined to allow a capture of instantaneous characteristics of the channel to be measured. The request further includes information that a frame-by-frame measurement is requested. According to the WiMax standard specified in Technical Specifications IEEE 802.16e it is mandatory to every MS in the WiMax network to provide such channel-condition measurements on request. Then, in step 103 MS performs the requested channel-condition measurements and sends as a response to BS information indicating the channel quality in the wireless link. The response comprises information indicating either physical measurement of the channel condition or effective measurement of the channel condition that is possible for this particular MS sending the response. As an example, physical measurements may comprise information relating to an average CINR measurement, a layer-specific CINR measurement, a SNR measurement, complex beamforming weights or quantized precoding weights, and effective measurements may comprise an effective CINR encoding. In common in this application both physical and effective measurements are denoted channel-condition measurements. The received information from MS is given in a form of a condition figure, preferably an integer value, that defines a range between threshold values, a threshold range, within which the actual channel-condition measurement is. The condition figure may also comprise complex weights that are quantized in a known way. Correspondencies between different condition figures and different threshold ranges are known in advance in MS in order to allow mapping of a certain condition figure to a certain threshold range. Then in step 105 BS receives the condition figure indicating an instantaneous channel-condition measured by MS. Correspondencies between different condition figures and different threshold ranges are known in advance also in BS in order to allow mapping of a certain condition figure to a certain threshold range. Lets denote these threshold ranges as first threshold ranges. Then in step 107 BS maps the received condition figure to the corresponding first threshold range. In the following step 109 within the mapped first threshold range BS selects a comparison value denoted as x from the first threshold range and in step 117 the comparison value x is compared to a second threshold range that is stored in BS. Preferably, the comparison value is selected from values within the first threshold range so that it is near or equals to the lower threshold limit value. The second threshold range is a pre-determined set of threshold values that is generated by running certain simulations of measurements in a known channel with respect to behaviour of the channel in order to maximize the transmission data rate of the frame, i.e. obtaining a best transmission mode for different transmission scenarios as shown in step 111. Obtaining the second threshold ranges is described later in more detail. The second threshold ranges are stored in BS according to step 113. In step 119 the second threshold range is found within which the comparison value lies and in step 121 the transmission mode corresponding to the found second threshold range is selected for transmission. If a plurality of the second threshold ranges are stored in step 113, the comparison value x the second threshold ranges are compared in successive order to find a correct one according to steps 115, 117, 119 and 127. If the second threshold range is not found at all, then according to step 129 a new channel-condition measurement is requested. In step 121 the transmission mode comprises spatial mode, modulation and/or coding schemes to be used in order to achieve the best transmission data rate of the frame to be transmitted next, as shown in step 123. The best transmission mode may not be always the one with the highest data rate. Since BS has knowledge of multiple users it may use basically any data rate for a specific user in order to maximize the multiuser throughput. Thus BS may also use the knowledge of the interference scenario as another criterion for the transmission mode.

According to WiMax specifications multiple-input multiple-output (MIMO) transmission technology of coding and modulation is supported. In mobile WiMax networks at least two MIMO modes are applied, namely the space-time coding (STC) and spatial multiplexing (SM). It has been discussed that there can be more modes available in the future, such as closed loop beamforming or MIMO precoding. The MIMO modes use multiple antennas at the transmission and reception. Optimal switching between the MIMO modes provides the best transmission data rates in the channel. Assuming that MS supports both of the MIMO modes, it is necessary for providing optimal switching to have a mechanism in BS that is capable of deciding which of the MIMO modes to use in varying channel conditions. This decision has to be made based on the up-to-date set of channel condition measurements that are provided by the WiMax specifications IEEE 802.16e. Based on these measurements BS concludes whether the wireless channel is in bad condition so that more robust MIMO mode is a good selection or whether it is sufficiently good then less robust MIMO mode is a good choice. To provide the MIMO mode switching in BS makes the selection accurate regardless of whether MS is capable of signalling its MIMO mode preference itself or not. In accordance above the decision of transmission mode in step 121 of FIG. 1 comprises at least selection of the MIMO mode and modulation and/or coding schemes to be used in transmission of the next frame.

According to the invention BS transmits a request to MS to perform channel-condition measurements between BS and MS. The request to MS comprises at least instructions for measurement type and measurement point in time. Preferably, BS requests MS to report back the channel condition using fast feedback channels (e.g. CQICH) in UL if the requested MS supports fast feedback. The requested measurements may be either physical or effective measurements. The WiMax standard specifies post detection CINR measurement as a physical channel condition measurement performed by MS on request. The post detection CINR measurement is derived on detector-constraint mutual information of the MIMO channel. This measurement is not modulation and code rate constraint. Two types of measurements are defined that MIMO capable MS can perform and report back to BS, namely average post detection CINR measurement of the channel (after this denoted as average CINR) and post detection CINR measurement for individual layers of the channel (after this denoted as per-layer CINR). As an example, average CINR may comprise post detection CINR averaged over layers or differential of CINR of selected layers. In this application the layer is understood as a separate coding/modulation path. Effective channel condition measurements provide information about maximum modulation/coding schemes (MCS) that can be utilized by the particular MS that is requested to perform the measurements. In this case BS and MS have a common index table providing certain correspondences, e.g. that index 17 means ½ rate 16 QAM or index 18 ¾ rate 16 QAM. Then MS feeds back only the index for maximum allowable MCS. Therefore, effective CINR measurement reduces the required feedback rate from MS.

To assure as fresh information on channel conditions as possible, the request to MS comprises also a parameter relating to measurement point in time. BS selects this parameter as large as allowed by the WiMax standard to allow instantaneous characteristic of the channel to be captured. According to standard this parameter is used for deriving physical CINR estimates reported through CQICH to BS frame-by-frame basis. Value is given in multiples of $\frac{1}{16}$ in increasing order. However, in some cases BS may filter the parameter information over multiple frames which would be beneficial e.g. in low mobility situations where MIMO mode change on frame-by-frame basis for every MS may cause a lot of signalling overhead.

The WiMax specifications support different multiantenna technologies and indicate that STC mode (matrix A) and SM mode (matrix B) should be switched adaptively depending on the instantaneous radio channel conditions. At low CINR levels STC mode performs best due to the high degree of diversity but at high CINR levels (such as 20-30 dB) SM mode is superior as long as the MIMO radio channel is rich scattering and supports at least two parallel data streams. STC mode uses multiple antennas at the transmission and reception to increase reliability of the wireless link, whenever the link is not of sufficient quality. On the other hand, SM mode uses multiple antennas to provide higher throughput of the wireless link, whenever the link quality is sufficiently good. Therefore, STC can be seen as a form of spatial modulation which is robust but does not increase the wireless link throughput. On the contrary, SM can be seen as another form of spatial modulation which is less robust but increases the wireless link throughput. Consequently, if the MIMO channel is correlated (bad channel for SM mode) the post-detection CINR will be low. If the MIMO mode is not correlated (good channel for SM mode) the post-detection CINR will be large. This property is used as a basis for obtaining and generating the second threshold ranges for selecting the transmission mode as explained later in this application.

In WiMax specifications vertical encoding indicates transmitting a single encoded stream over multiple antennas, where the number of encoded streams is always 1. Horizontal encoding indicates multiple separately encoded streams over multiple antennas, where the number of encoded streams is more than one. A layer is defined as a separate coding/modulation path. Number of layers defines number of individually encoded streams allocated in the region. In this application measurement information received from MS, referred as a condition figure, is mainly used according to following principles. A layer-specific measurement information is utilized so that BS uses different modulation/coding schemes (MCS) for different layers if SM mode is used. BS can also utilize the layer-specific measurement information to decide whether STC or SM mode should be used. According to one embodiment of the invention if only one layer has good CINR then STC mode is used. According to a second embodiment of the invention if two or more layers have adequate CINR then SM is used. According to a third embodiment of the invention if adequate CINR of two or more layers is combined in BS to a single CINR, then SM mode with vertical encoding is used. Transmission mode selection according to all embodiments of the invention further comprises selection of antennas or antenna groups and precoding of selected antennas as well as associated timing as explained later in this application. Referring now to FIGS. 2a-2e above-mentioned embodiments and combinations derived from them are discussed in more detail below.

Figure 2A:
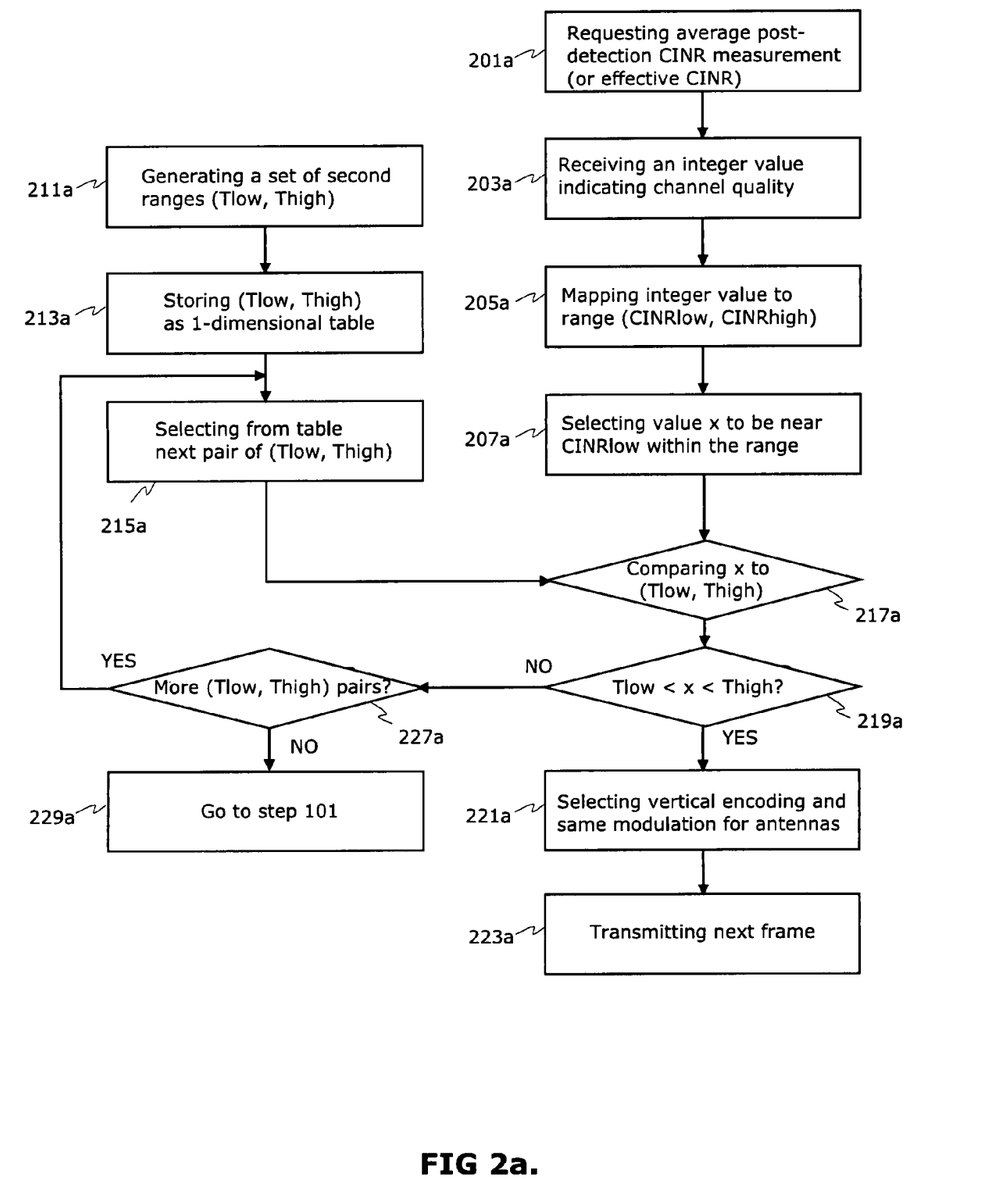
FIG. 2a depicts a flow diagram of an embodiment according to the invention.

An embodiment of the invention is shown in FIG. 2a. In step 201a an average post detection CINR measurement is requested by BS and in step 203a BS receives an integer value indicating the condition figure of the channel, the condition figure corresponding to average CINR over layers. Alternatively, an effective CINR measurement is requested in step 201a the condition figure indicating a maximum MCS capacity of the channel defined by MS is received in step 203a (shown in parenthesis in FIG. 2a). Then, in step 205a the condition figure is mapped in BS to a first threshold range so that the pre-defined correspondence with this condition figure and the first threshold range is found. This first threshold range is either the same as defined for MS in order to perform CINR measurements or it can be pre-defined particularly for BS only. In the first alternative the mapping of integer values to the threshold ranges is known in advance to BS and MS. Lets describe the first threshold range as a pair of threshold values (CINRlow, CINRhigh), where CINRlow is a lower limit value for the first threshold range and CINRhigh is a higher limit value for the first threshold range so that said range is between those limit values including said limit values. Next in step 207a there is selected a comparison value denoted x within the first threshold range including the limit values. Preferably, the comparison value x is selected to equal to CINRlow. In principal CINRhigh can be used as well or any intermediate value between CINRlow and CINRhigh. In general, the closer the value x is to CINRlow the more "pessimistic" a decision of transmission mode selection is to be and the closer the value x is to CINRhigh the more "optimistic" a decision of transmission mode selection is to be. Therefore, selection of CINRlow to be the comparison value x is the best choice in order to make the final decision of transmission mode most reliable. In step 217a the comparison value x is compared to the second threshold range that is generated (step 211a) as explained later in this application and stored in BS. Lets describe the second threshold range as a pair of threshold values (Tlow, Thigh), where Tlow is a lower limit value for the second threshold range and Thigh is a higher limit value for the second threshold range so that said range is between those limit values including said limit values. According to this embodiment in step 213a the second threshold range, i.e. (Tlow, Thigh) pair(s), is stored in a form of one-dimensional table. In step 219a a (Tlow, Thigh) pair from the second threshold range is found within which including limit values the comparison value x lies. Iterations along steps 219a, 227a, 215a and 217a are performed if required. Then in step 221a the transmission mode comprising vertical encoding and same modulation for all antennas is selected for transmission of a next frame according to step 223a. The transmission mode further comprises information about antenna grouping, antenna selection and/or antenna precoding.

Figure 2B:
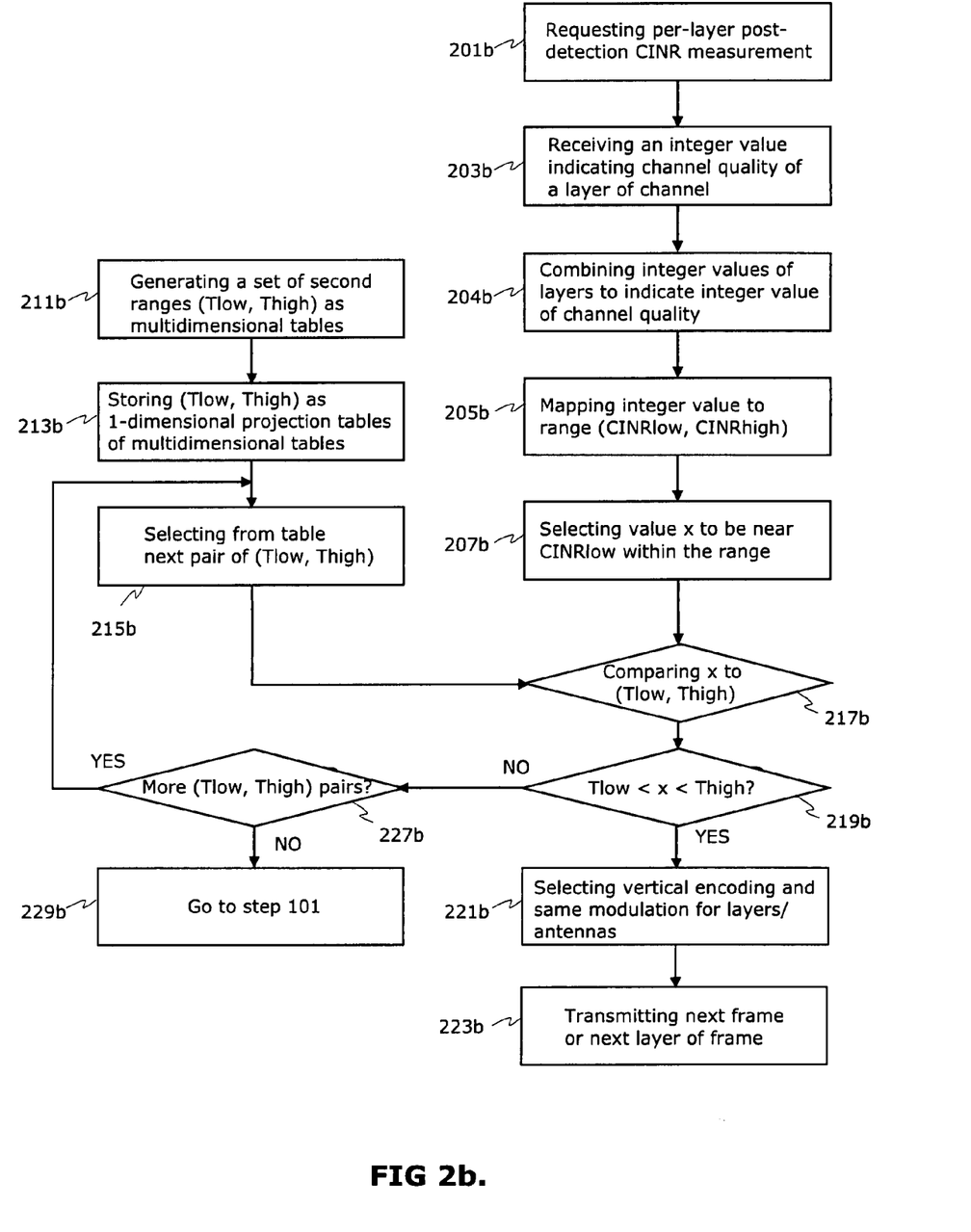
FIG. 2b depicts a flow diagram of another embodiment according to the invention.

Another embodiment of the invention is shown in FIG. 2b. In step 201b a per-layer post detection CINR measurement is requested by BS and in step 203b BS receives an integer value indicating the condition figure of the layer of the channel. In step 204b the condition figures of layers are combined to indicate a single condition figure of the channel, the single condition figure corresponding to joint CINR over layers. As an example, the single condition figure X of the condition figures of n layers can be calculated as $$X = \frac{1}{N}\sum_{n=1}^{N} X_n$$

Here it is assumed that $X_n$ is the measure of the n-th layer after mapping it from integer value to the value within the interval of (Tlow, Thigh) thresholds. Some other ways to calculate the single measurement value X can be used without limiting the invention. Then, in step 205b the condition figure is mapped in BS to a first threshold range so that the pre-defined correspondence with this condition figure and the first threshold range is found. This first threshold range is either the same as defined for MS in order to perform CINR measurements or it can be pre-defined particularly for BS only. In the first alternative the mapping of integer values to the threshold ranges is known in advance to BS and MS. Lets describe the first threshold range as a pair of threshold values (CINRlow, CINRhigh), where CINRlow is a lower limit value for the first threshold range and CINRhigh is a higher limit value for the first threshold range so that said range is between those limit values including said limit values. Next in step 207b there is selected a comparison value denoted x within the first threshold range including the limit values. Preferably, the comparison value x is selected to equal to CINRlow, for the reasons described in connection with FIG. 2a. In step 217b the comparison value x is compared to the second threshold range that is generated (step 211b) as explained later in this application and stored in BS. Lets describe the second threshold range as pairs of threshold values (Tlow, Thigh), where Tlow is a lower limit value for the second threshold range and Thigh is a higher limit value for the second threshold range so that said range is between those limit values including said limit values. According to this embodiment in step 213b the second threshold range, i.e. (Tlow, Thigh) pairs, is stored in a form of one-dimensional table or one-dimensional projection table derived from multidimensional tables (described more detail in association with figure X). In step 219b a (Tlow, Thigh) pair from the second threshold range is found within which including limit values the comparison value x lies. Iterations along steps 219b, 227b, 215b and 217b are performed if required. Then in step 221b the transmission mode comprising vertical encoding and same modulation for all layers/antennas is selected for transmission of a next frame according to step 223*b*. The transmission mode further comprises information about antenna grouping, antenna selection and/or antenna precoding.

Figure 2C:
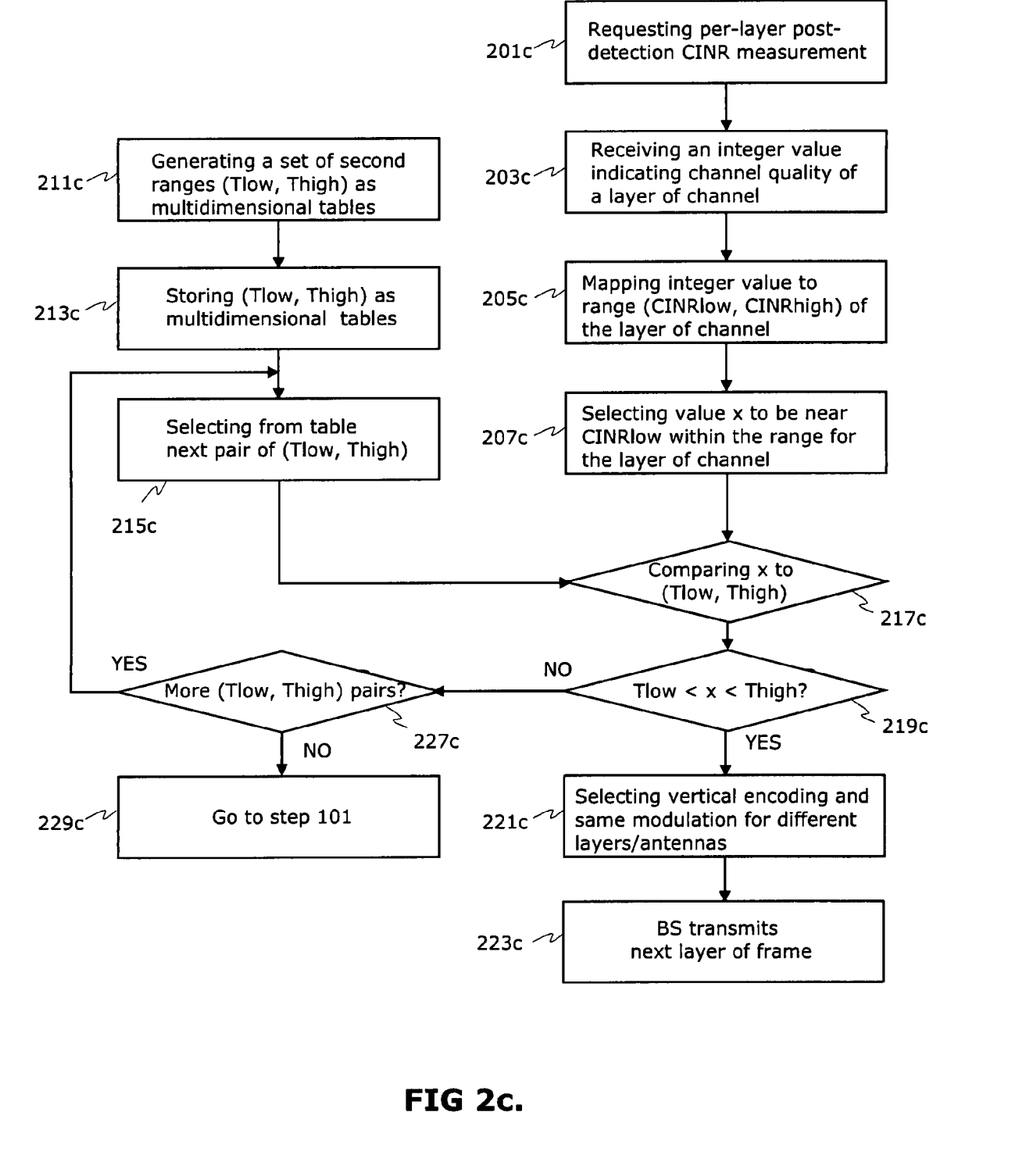
FIG. 2c depicts a flow diagram of another embodiment according to the invention.

Another further embodiment of the invention is shown in FIG. 2*c*. In step 201*c* a per-layer post detection CINR measurement is requested by BS and in step 203*c* BS receives an integer value indicating the condition figure of the layer of the channel. Then, in step 205*c* the condition figure of the layer is mapped in BS to a first threshold range so that the pre-defined correspondence with this condition figure and the first threshold range is found. This first threshold range is either the same as defined for MS in order to perform per-layer CINR measurements or it can be pre-defined particularly for BS only. In the first alternative the mapping of integer values to the threshold ranges is known in advance to BS and MS. Lets describe the first threshold range as a pair of threshold values (CINRlow, CINRhigh) for each layer of the channel, where CINRlow is a lower limit value for the first threshold range and CINRhigh is a higher limit value for the first threshold range so that said range is between those limit values including said limit values. Next in step 207*c* there is selected a comparison value denoted x within the first threshold range including the limit values for each layer of the channel. Preferably, the comparison value x is selected to equal to CINRlow, for the reasons described in connection with FIG. 2*a*. In step 217*c* the comparison value x of each layer is compared to the second threshold range that is generated (step 211*c*) as explained later in this application and stored in BS. Lets describe the second threshold range as a pair of threshold values (Tlow, Thigh) for each layer of the channel, where Tlow is a lower limit value for the second threshold range and Thigh is a higher limit value for the second threshold range so that said range is between those limit values including said limit values. According to this embodiment in step 213*c* the second threshold range, i.e. (Tlow, Thigh) pairs, is stored in a form of multidimensional table(s) (described more detail in association with FIG. 5*b*). In step 219*c* a (Tlow, Thigh) pair from the second threshold range is found within which including limit values the comparison value x lies. Iterations along steps 219*c*, 227*c*, 215*c* and 217*c* are performed if required. Then in step 221*c* the transmission mode comprising vertical encoding and same modulation for different layers/antennas is selected for transmission of a next layer of the frame according to step 223*c*. The transmission mode further comprises information about antenna grouping, antenna selection and/or antenna precoding.

Figure 2D:
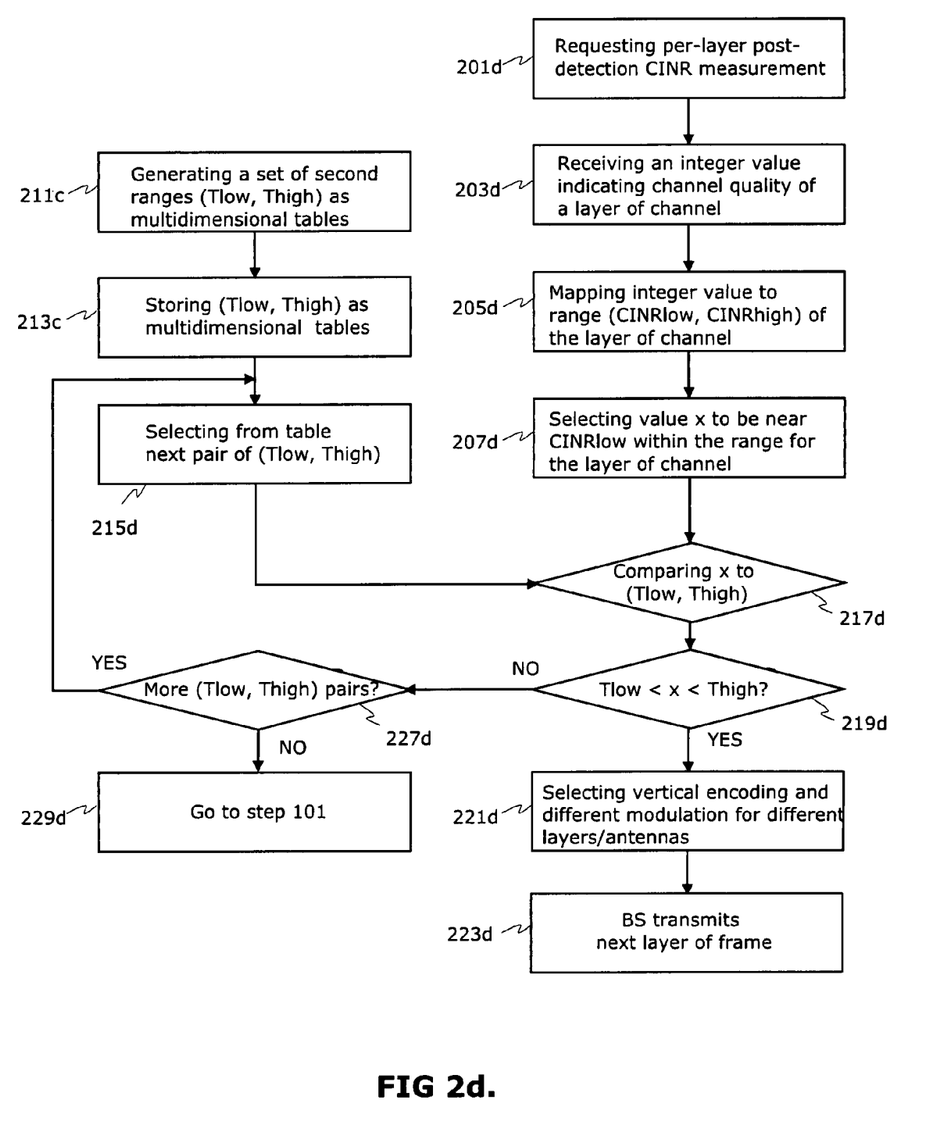
FIG. 2d depicts a flow diagram of another embodiment according to the invention.

Another further embodiment of the invention is shown in FIG. 2*d*. In step 201*d* a per-layer post detection CINR measurement is requested by BS and in step 203*d* BS receives an integer value indicating the condition figure of the layer of the channel. Then, in step 205*d* the condition figure of the layer is mapped in BS to a first threshold range so that the pre-defined correspondence with this condition figure and the first threshold range is found. This first threshold range is either the same as defined for MS in order to perform per-layer CINR measurements or it can be pre-defined particularly for BS only. In the first alternative the mapping of integer values to the threshold ranges is known in advance to BS and MS. Lets describe the first threshold range as a pair of threshold values (CINRlow, CINRhigh) for each layer of the channel, where CINRlow is a lower limit value for the first threshold range and CINRhigh is a higher limit value for the first threshold range so that said range is between those limit values including said limit values. Next in step 207*d* there is selected a comparison value denoted x within the first threshold range including the limit values for each layer of the channel. Preferably, the comparison value x is selected to equal to CINRlow, for the reasons described in connection with FIG. 2*a*. In step 217*d* the comparison value x of each layer is compared to the second threshold range that is generated (step 211*d*) as explained later in this application and stored in BS. Lets describe the second threshold range as a pair of threshold values (Tlow, Thigh) for each layer of the channel, where Tlow is a lower limit value for the second threshold range and Thigh is a higher limit value for the second threshold range so that said range is between those limit values including said limit values. According to this embodiment in step 213*d* the second threshold range, i.e. (Tlow, Thigh) pairs, is stored in a form of multidimensional table(s) (described more detail in association with FIG. 5*b*). In step 219*d* a (Tlow, Thigh) pair from the second threshold range is found within which including limit values the comparison value x lies. Iterations along steps 219*d*, 227*d*, 215*d* and 217*d* are performed if required. Then in step 221*d* the transmission mode comprising vertical encoding and different modulations for different layers/antennas is selected for transmission of a next layer of the frame according to step 223*d*. The transmission mode further comprises information about antenna grouping, antenna selection and/or antenna precoding.

Figure 2E:
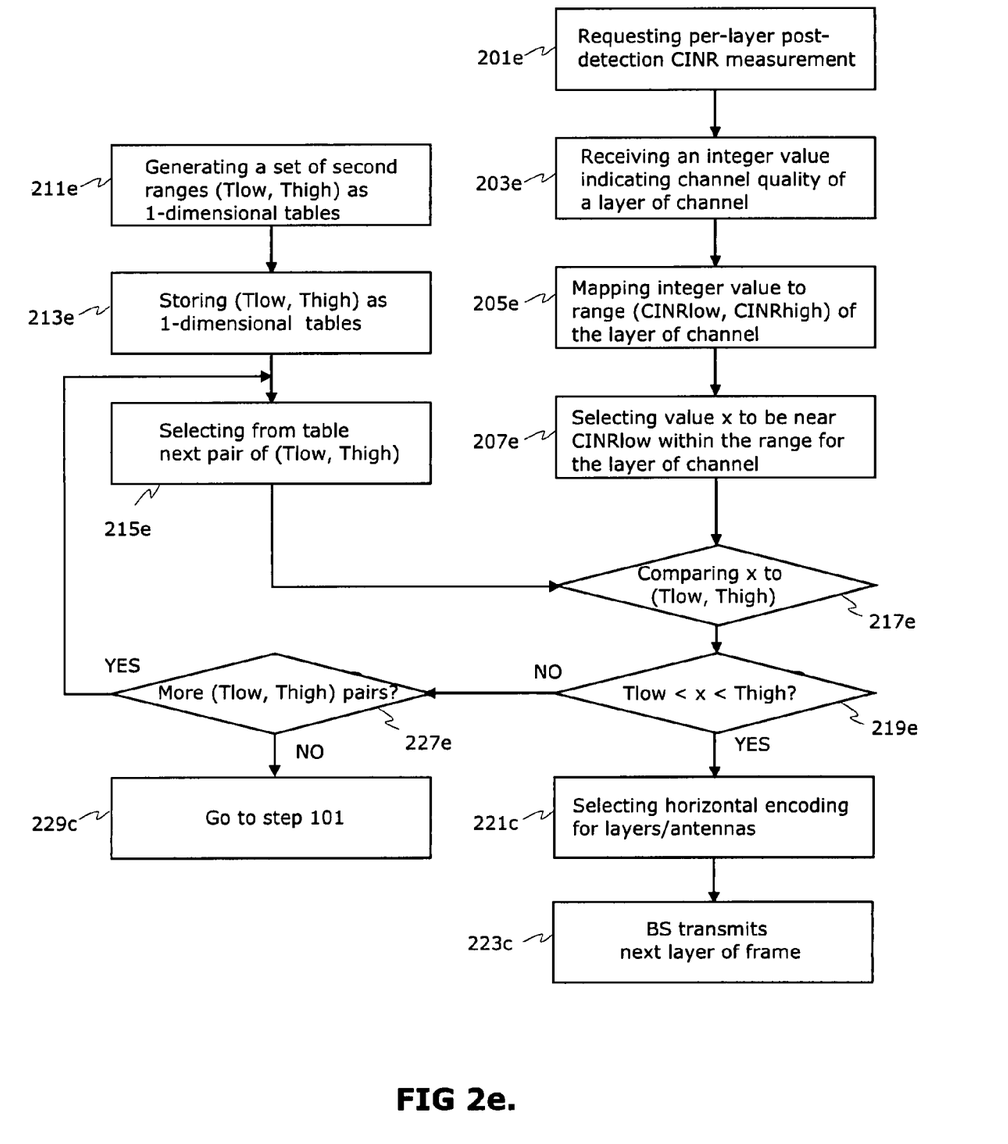
FIG. 2e depicts a flow diagram of another embodiment according to the invention.

Still another embodiment of the invention is shown in FIG. 2*e*. In step 201*e* a per-layer post detection CINR measurement is requested by BS and in step 203*e* BS receives an integer value indicating the condition figure of the layer of the channel. Then, in step 205*e* the condition figure of the layer is mapped in BS to a first threshold range so that the pre-defined correspondence with this condition figure and the first threshold range is found. This first threshold range is either the same as defined for MS in order to perform per-layer CINR measurements or it can be pre-defined particularly for BS only. In the first alternative the mapping of integer values to the threshold ranges is known in advance to BS and MS. Lets describe the first threshold range as a pair of threshold values (CINRlow, CINRhigh) for each layer of the channel, where CINRlow is a lower limit value for the first threshold range and CINRhigh is a higher limit value for the first threshold range so that said range is between those limit values including said limit values. Next in step 207*e* there is selected a comparison value denoted x within the first threshold range including the limit values for each layer of the channel. Preferably, the comparison value x is selected to equal to CINRlow, for the reasons described in connection with FIG. 2*a*. In step 217*e* the comparison value x of each layer is compared to the second threshold range that is generated (step 211*e*) as explained later in this application and stored in BS. Lets describe the second threshold range as a pair of threshold values (Tlow, Thigh) for each layer of the channel, where Tlow is a lower limit value for the second threshold range and Thigh is a higher limit value for the second threshold range so that said range is between those limit values including said limit values. According to this embodiment in step 213*e* the second threshold range, i.e. (Tlow, Thigh) pairs, is stored in a form of one-dimensional table(s). In step 219*e* a (Tlow, Thigh) pair from the second threshold range is found within which including limit values the comparison value x lies. Iterations along steps 219*e*, 227*e*, 215*e* and 217*e* are performed if required. Then in step 221*e* the transmission mode comprising horizontal encoding layers/antennas is selected for transmission of a next layer of the frame according to step 223*e*. The transmission mode further comprises information about antenna grouping, antenna selection and/or antenna precoding.

Figure 3:
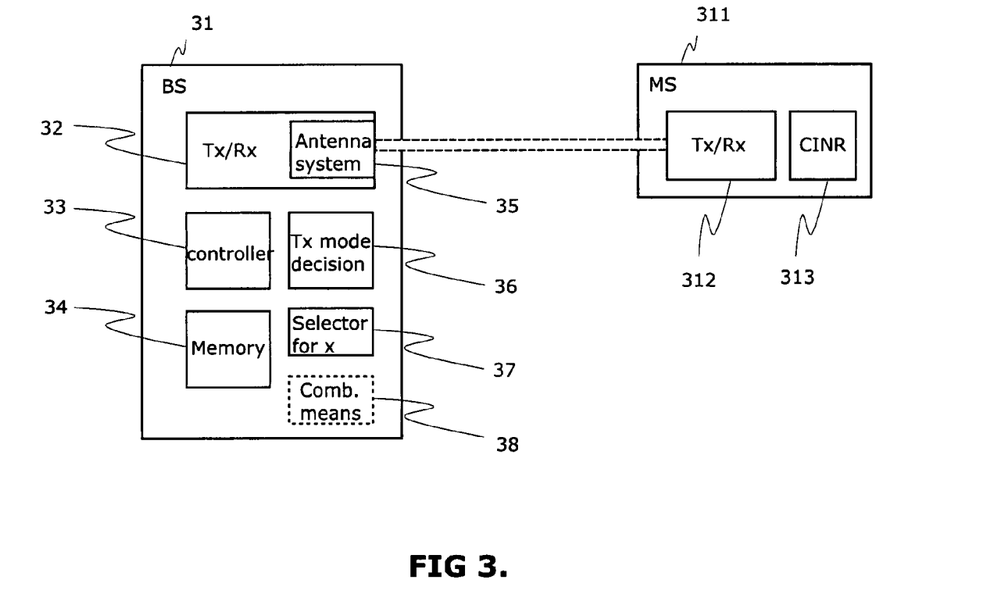
FIG. 3 depicts a block diagram of network element according to an embodiment of the invention.

FIG. 3 depicts a network element 31 in BS according to an embodiment of the invention arranged to communicate with a mobile station 311 through multipath channels in a wireless link. The network element 31 comprises a transmitter 32 that sends a request to MS 311 to feedback information about a channel quality in the wireless channel between the network element 31 and MS 311. The request includes information about a type of measurement required by network element 31 and at least a parameter defining a capture of instantaneous behaviour of the channel. The choice of requested type of channel condition measurement depends on the applied transmitter 32 structure. The request further includes that information of channel condition is requested frame-by-frame basis. MS 311 comprising receiver-transmitter 312 and means 313 for performing physical and/or effective channel condition measurements and sends as a response to network element 31 information indication the channel quality in the wireless link. The network element 31 comprises a receiver 32 that receives as a response to a request at least one condition figure indicating instantaneous condition of a channel measured by MS 311. The transmitter 32 and receiver 32, or transceiver, comprises or is connected to an antenna system 32 that is able to transmit and receive in multi-input multiple-output (MIMO) schemes in accordance with the WiMax specifications IEEE 802.16e. The received condition figure, preferably an integer value, defines a range between threshold values, a first threshold range, within which the actual channel condition measurement is. Correspondencies between condition figures and first threshold ranges are known in advance in the network element 31 and MS 31. The network element 31 further comprises a controller 33 for mapping the condition figure to the first threshold range, said first threshold range being limited with a first minimum threshold value and a first maximum threshold value. Further the network element 31 comprises a means 37 for selecting a comparison value x arranged to be within the first threshold range including limit values. Preferably, the comparison value is chosen to be near or equaling to the lower threshold limit value of the first threshold range. The network element 31 further comprises a memory 34 to store at least one second threshold range being limited with a second minimum threshold value and a second maximum threshold value. The second threshold range is pre-determined set of threshold values that is generated by running simulations in a known channel (explained later more detail) in order to correspond to a transmission mode of a best transmission data rate. The network element further comprises a decision making block 36 that compares the comparison value to at least one second threshold range. When the second threshold range is found within which the comparison value x lies the decision making block 36 selects the transmission mode corresponding to the second threshold range within which the comparison value x belongs. After this the transmitter 32 and the antenna system 35 transmits the frame forwards in selected transmission mode comprising a selected MIMO mode and modulation and/or coding schemes (MCS).

The network element 31 takes into account the reported channel quality information (e.g. physical or effective measurements) and decides what is the actual transmission mode comprising MIMO modes and the MCS to be used in the next frame. The decision may not depend only on the MIMO radio channel characteristics but also the system level radio resource management issues may be taken into account as well. As a result a transmission mode comprising the MIMO mode and MCS mode are selected so that the total transmission data rate is maximized in the wireless channel.

Other embodiments of the network element according to the invention are arranged to perform variations of transmission mode selection as described in connection of FIGS. 2a-2e. One embodiment of the network element 31 further comprises combining means (38) arranged to perform the variation of FIG. 2b described, namely combining condition figures of different layers of the channel to indicate a single condition figure of the channel quality over all layers.

Preferably, applying dual-polarized antennas 35 in the network element 31 improves system performance both in line-of-sight (LOS) and non-line-of-sight (NLOS) scenarios (MS can have any kind of antenna pair). The transmission mode selection according to the invention suits especially well for 2×2 MIMO concept with two Tx and Rx antennas to be used in WiMax and UMTS (universal mobile telecommunications system) networks. Experiments show that the MIMO capacity is dominated by the CINR level. Accordingly, the relative capacity may degrade in difficult path loss situations, where signal levels (SNR) are greatly reduced, e.g. in situations MS is moving from LOS to NLOS. In these situation correlation between TX/RX antennas may be adequately small for MIMO purposes but the low SNR does not support the use of multiple parallel data streams. The increased delay spread in NLOS on the other hand indicates a rich scattering environment which in principal is a requirement for good MIMO performance. Adaptive MIMO mode selection is thus needed to identify channel states which offer adequate CINR level with rich scattering environment. LOS situation is a special case which offers high CINR level but often has a drawback that the TX/RX antennas may be highly correlated. In this case the dual-polarised antennas offer two orthogonal dimensions which have high CINR and small correlation between the orthogonally polarised antennas.

Antenna system 35 of FIG. 3 comprises multiple Tx/Rx antennas that can be organised to constitute e.g. 2×2 MIMO, 4×4 MIMO or more antennas or antenna groups. According to an embodiment of the invention transmission mode selection comprises selection of the best antennas or antenna groups from a plurality of Tx antennas. As an example, from the plurality of antennas two (2×2 MIMO) or four (4×4 MIMO) best antennas or antenna groups are selected for transmission, and the selected antennas/groups apply transmission mode according to embodiments of the invention described in association with FIGS. 2a-2e. As another example, from 3-4 Tx antennas two best antennas/antenna groups are selected for each frame and these two antennas/groups are utilized for transmission in 2×2 STC or SM mode according to embodiments of the invention described in association with FIGS. 2a-2e. It is noted that the number of active receiving antennas may differ from the number of active transmit antennas. In addition, the selected antennas/antenna groups apply antenna precoding according to the Wimax specification, i.e. that signals of the selected antennas/antenna groups are weighted by certain predefined weighting coefficients. The decision making block 36 of the network element 31 being responsible for selection of MIMO mode is also arranged to indicate information on selection of antenna grouping, antenna selection and precoding matrix.

According to an embodiment of the invention a computer-readable medium having computer-executable components is introduced. An embodiment of such a computer programmable product is arranged to perform the steps of the method described in connection of FIGS. 1 and 2a-2e. Another embodiment of such a computer programmable product is arranged to perform function blocks of the network element 31 described in connection with FIG. 3 when the program is stored in the memory 34 and executed by the controller 33.

Such function blocks include at least the decision making block 36 and means 37 for selecting a comparison value. One embodiment of such a computer program product further comprises a function block means 38 for combining condition figures of different layers of the channel to indicate a single condition figure of the channel quality over all layers.

Figure 4:
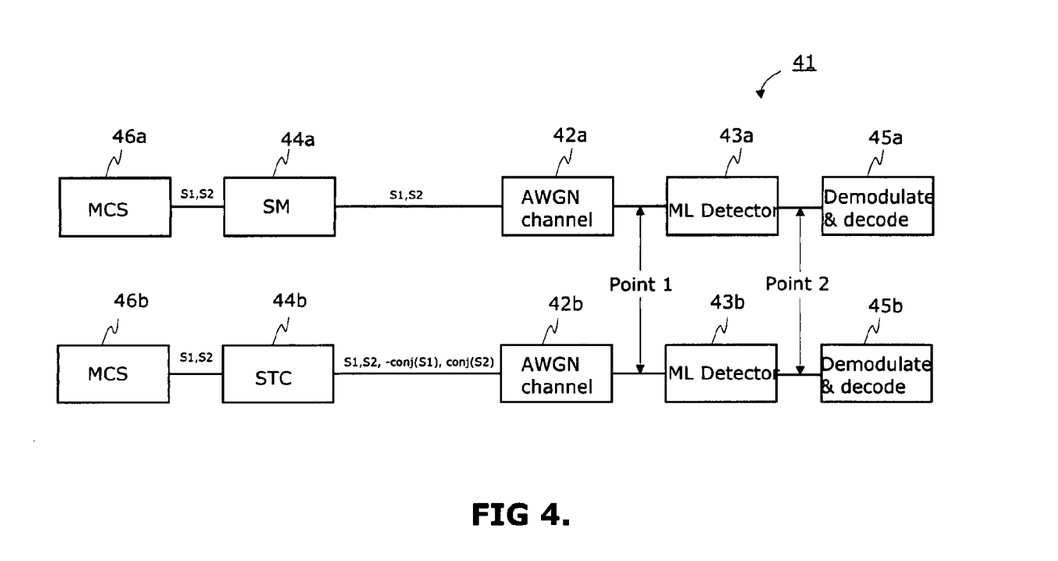
FIG. 4 depicts a block diagram of an arrangement for simulating transmission mode.
Figure 5A:
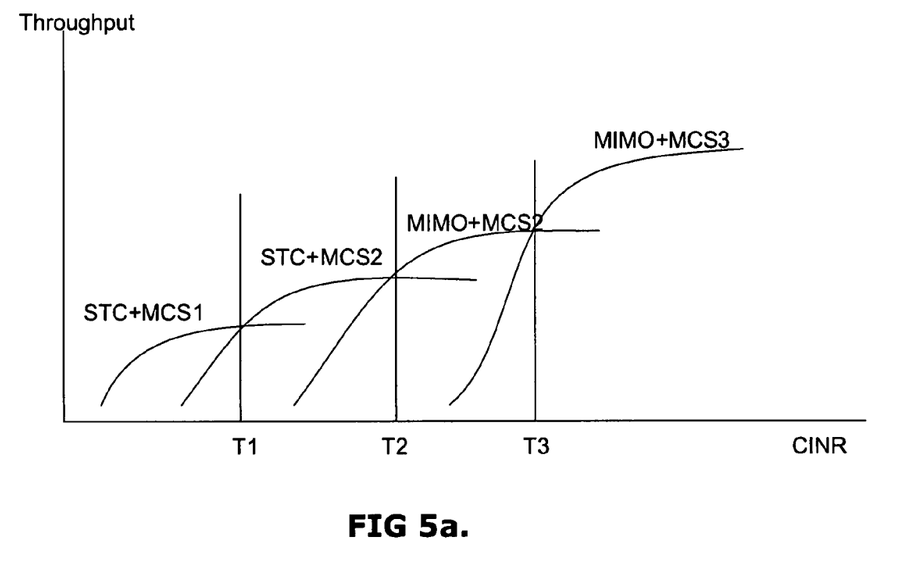
FIG. 5a depicts an example of a diagram for obtaining threshold values for selection of transmission mode.
Figure 5B:
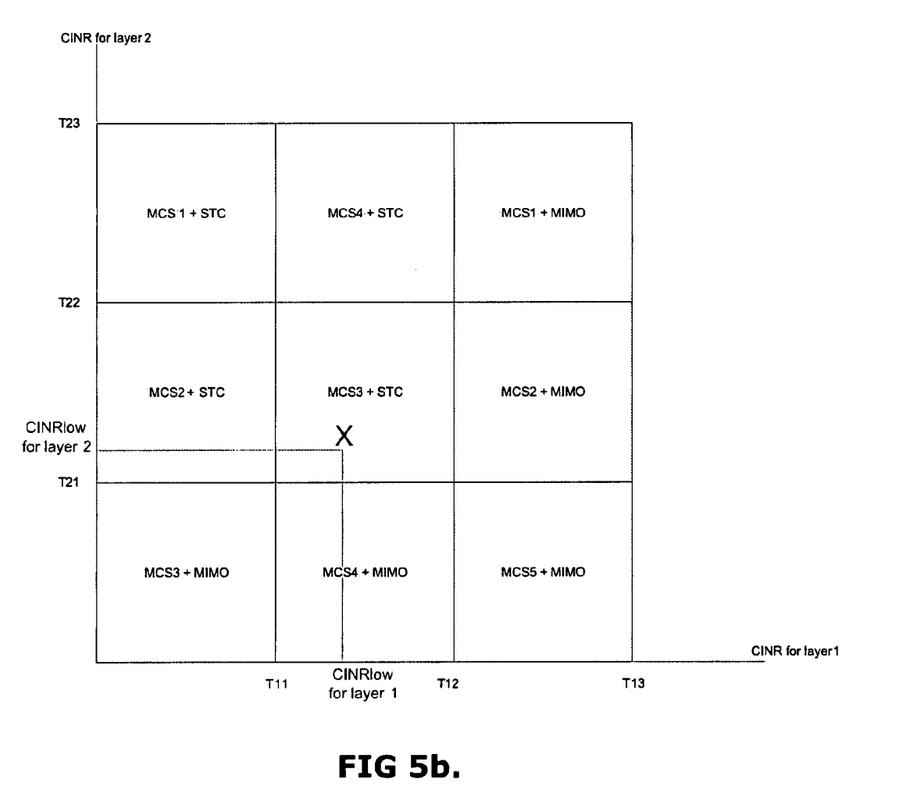
FIG. 5b depicts another example of a diagram for obtaining threshold values for selection of transmission mode.

FIG. 4 depicts an exemplary arrangement in order to obtain the second threshold values for the comparing step 117 of FIG. 1. More precisely a simulation model for SM and STC mode is depicted. The second threshold range is obtained by running throughput (data rate) versus CINR simulations for MIMO modes and all the available MCS schemes in a known channel, preferably additive white gaussian noise (AWGN) channel. The assumption is made that the equivalent channel seen at the output of the MIMO detector is AWGN channel. An example of such simulation results is depicted in FIG. 5*a* and an example of 2-dimensional table of the second threshold values is depicted in FIG. 5*b*. Different sets of thresholds are generated if the CINR is measured at different points in the receiver 41 comprising at least detectors 43*a*, 43*b*, e.g. maximum likely-hood symbol (ML) detectors, and demodulation and decoding units 45*a*, 45*b* as shown in FIG. 4. A first stream of frames (bursts) received on AWGN channel block 42*a* is modulated and encoded in MCS block 46*a* and SM block 44*a* and a second stream of frames (bursts) on AWGN channel block 42*b* is modulated and encoded in MCS block 46*b* and STC block 44*b*. The possible points of measurement are shown as Point 1 and Point 2. When CINR measurements are performed in Point 1 of FIG. 4 only one set of second thresholds is needed as exemplary shown in FIG. 5*a*. When CINR measurements are made in Point 2 of FIG. 4 the number of required sets of second thresholds equals to the number of different MIMO modes between which the switching is desired. This is due to the fact that CINR measurements at Point 2 are always MIMO mode specific. In multidimensional case the throughput results are stored with respect to the set of individual per-layer CINR measurements. An example of such 2-dimensional look up table is shown in FIG. 5*b*. The number of dimensions corresponds to per-layer CINR measurements. Alternatively, the second threshold ranges can be obtained by measuring the channel at the site where BSs (and MSs) are likely to be deployed and creating the channel model based on CINR measurements. The simulations can then be performed with hardware that is actually used in BS and MS with channel being simulated by a channel emulator (not shown).

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is intended that the invention described here is not only limited to the way the measurement is calculated in the applicable standard, such as WiMAX standard. Any other more accurate measurements can applied with the invention. Further, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is intention, therefore, to be limited only as indicated by scope of the claims appended hereto.

The invention claimed is:

1. A method for selecting a best transmission mode for frame between a base station and a mobile terminal in a wireless channel in every channel conditions, comprising
   receiving at the base station as a response to a request to the mobile terminal at least one condition figure indicating instantaneous condition of a channel,
   mapping at the base station the condition figure to a first threshold range, said first threshold range being limited with a first minimum threshold value and a first maximum threshold value and being predefined to correspond the condition figure,
   selecting at the base station a comparison value to be within the first threshold range,
   comparing at the base station the comparison value to at least one second threshold range being limited with a second minimum threshold value and a second maximum threshold value, wherein each of said second threshold ranges is stored in the base station and is pre-determined to correspond to a transmission mode of a best transmission data rate,
   selecting at the base station the transmission mode corresponding to the second threshold range within which the comparison value belongs in order to transmit the frame forwards,
   wherein the transmission mode comprises at least selection of one of multiple-input multiple-output mode, modulation and coding.

2. The method according to claim 1, wherein receiving the condition figure precedes performing a post detection CINR measurement at a mobile station and transmitting the condition figure indicating a predefined threshold range within which a result of the CINR measurement performed belongs.

3. The method according to claim 1, wherein comparing the comparison value precedes verifying a transmission data rate and a post detection CINR measurement for each transmission mode in a known channel and storing the at least one second threshold range that correlates to the transmission mode providing a best transmission data rate according to verifying.

4. The method according to claim 3, wherein the transmission mode comprises one of the following modes: vertical encoding with same modulation for the channel, vertical encoding with same modulations for layers of the channel, vertical encoding with different modulations possible for layers of the channel and horizontal encoding.

5. The method according to claim 1, wherein the at least one second threshold range is stored at the base station in a form of one dimensional table or one dimensional projection values derived from n dimensional tables, n representing a number of layers of the channel.

6. The method according to claim 5, wherein the condition figure represents a single post detection CINR measurements of the channel.

7. The method according to claim 5, wherein the condition figure represents a combination of post detection CINR measurements of different layers of the channel.

8. The method according to claim 5, wherein the condition figure represents a post detection CINR measurement of a layer of the channel.

9. The method according to claim 1, wherein the at least one second threshold range is stored at the base station in a form of n dimensional tables, n representing a number of layers of the channel.

10. The method according to claim 9, wherein the condition figure represents a post detection CINR measurement of a layer of the channel.

11. Method according to claim 1, wherein the comparison value equals or is close to the first minimum threshold value.

12. The method according to 1, wherein the request for the condition figure comprises a parameter that allows BS to receive the condition figure indicating instantaneous condition of the channel.

13. The method according to claim 1, wherein the step of selecting the transmission mode further comprises selecting a number of antennas or antenna groups and selecting antenna precoding.

14. A network element in a base station, comprising
a receiver comprising at least one receiving antenna arranged to receive as a response to a request at least one condition figure indicating instantaneous condition of a channel,
a controller arranged to map the condition figure to a first threshold range, said first threshold range being limited with a first minimum threshold value and a first maximum threshold value and being predefined to correspond the condition figure,
a means for selecting a comparison value arranged to be within the first threshold range,
a memory arranged to store at least one second threshold range being limited with a second minimum threshold value and a second maximum threshold value, the second threshold range being pre-determined to correspond to a transmission mode of a best transmission data rate,
a decision making block arranged to compare the comparison value to at least one second threshold range,
the decision making block arranged to select the transmission mode corresponding to the second threshold range within which the comparison value belongs, wherein the transmission mode comprises at least selection of one of multiple-input multiple-output mode, modulation and coding, and
a transmitter comprising at least one transmitting antenna arranged to transmit the frame forwards.

15. The network element according to claim 14, wherein receiver is arranged receive the condition figure from a mobile station that performs a post detection CINR measurement and transmits the condition figure indicating a predefined threshold range within which a result of the CINR measurement performed belongs.

16. The network element according to claim 14, wherein the memory is arranged to store the at least one second threshold range that correlates to the transmission mode providing a best transmission data rate as a result of verifying a transmission data rate and a post detection CINR measurement for each transmission mode in a known channel.

17. The network element according to claim 16, wherein the transmission mode comprises one of the following modes: vertical encoding with same modulation for each antenna, vertical encoding with different modulations possible for each antenna and horizontal encoding.

18. The network element according to claim 14, wherein the memory is arranged to store the at least one second threshold range in a form of one dimensional table or one dimensional projection values derived from n dimensional tables, n representing a number of layers of the channel.

19. The network element according to claim 18, wherein the condition figure represents a single post detection CINR measurement of the channel.

20. The network element according to claim 18, wherein the network element further comprises a means for combining arranged to combine post detection CINR measurements of different layers of the channel received by the receiver to represent the condition figure.

21. The network element according to claim 18, wherein the condition figure represents a post detection CINR measurement of a layer of the channel.

22. The network element according to claim 14, wherein the memory is arranged to store the at least one second threshold range in a form of n dimensional tables, n representing a number of layers of the channel.

23. The network element according to claim 22, wherein the receiver is arranged to receive the condition figure representing a post detection CINR measurement of a layer of the channel.

24. The network element according to claim 14, wherein the comparison value equals or is close to the first minimum threshold value.

25. The network element according to 14, wherein the network element further comprises a transmitter arranged to send to the mobile station the request for the condition figure comprises a parameter that allows BS to receive the condition figure indicating instantaneous condition of the channel.

26. The network element according to claim 14, wherein the receiver and the transmitter comprises at least one dual-polarized antenna arranged to function in a multiple-input multi-output transmission modes.

27. The network element according to claim 14, wherein the decision making block is further arranged to select a number of transmitting antennas from multiple antennas or a number of transmitting antenna groups from multiple antenna groups and antenna precoding.

28. A computer-readable medium having computer-executable components, comprising
receiving as a response to a request at least one condition figure indicating instantaneous condition of a channel,
mapping the condition figure to a first threshold range, said first threshold range being limited with a first minimum threshold value and a first maximum threshold value and being predefined to correspond the condition figure,
selecting a comparison value arranged to be within the first threshold range,
storing at least one second threshold range being limited with a second minimum threshold value and a second maximum threshold value, the second threshold range being pre-determined to correspond to a transmission mode of a best transmission data rate,
comparing the comparison value to at least one second threshold range, and
selecting the transmission mode corresponding to the second threshold range within which the comparison value belongs,
wherein the transmission mode comprises at least selection of one of multiple-input multiple-output mode, modulation and coding.

* * * * *